Figure 1:
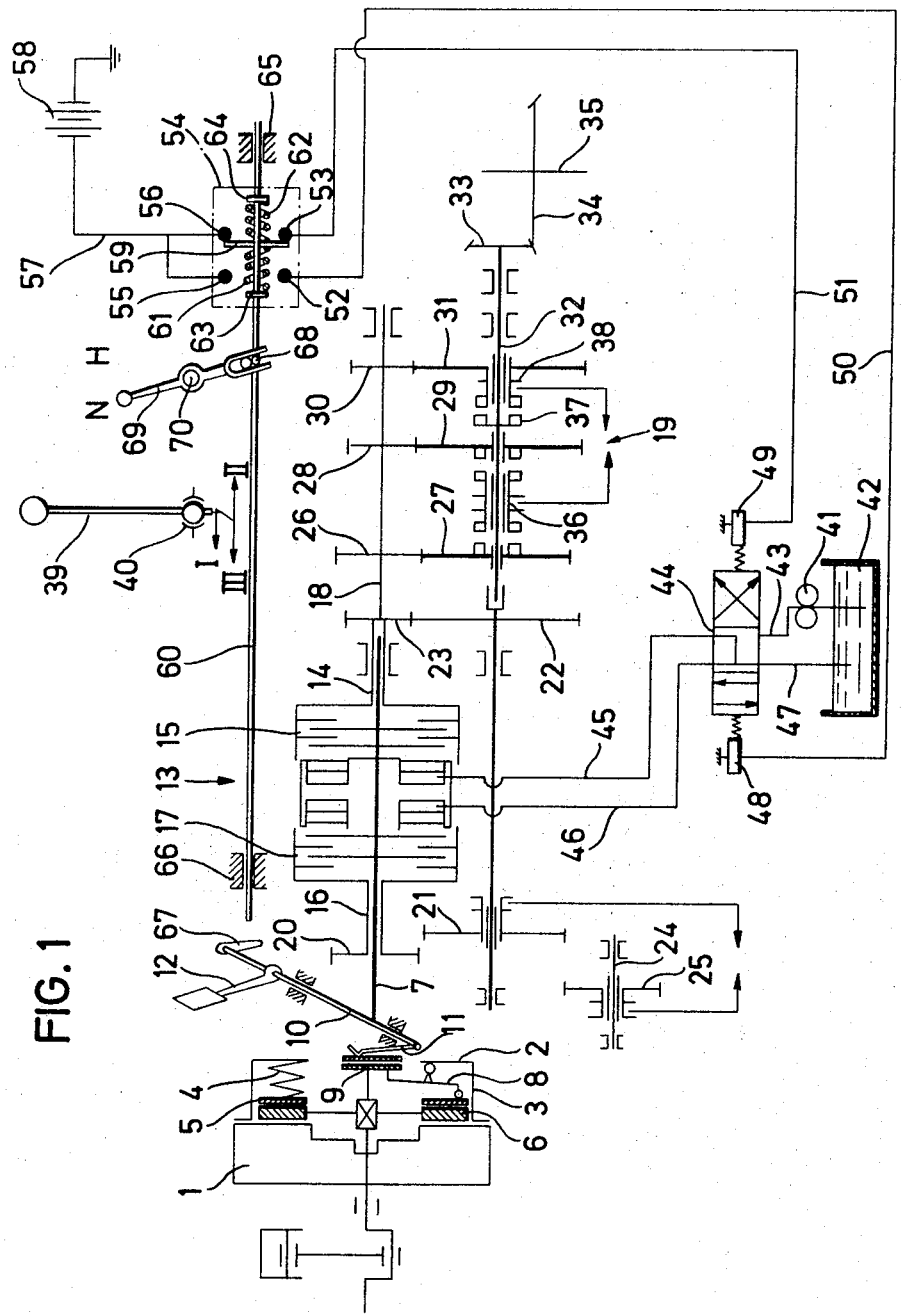

United States Patent [19]

May

[11] 3,741,035

[45] June 26, 1973

[54] METHOD OF AND DEVICE FOR CONTROLLING MULTI-STAGE CHANGE GEAR TRANSMISSIONS

[75] Inventor: Oswald May, Bonn, Germany

[73] Assignee: Klockner-Humboldt-Deutz Aktiengesellschaft, Cologne-Deutz, Germany

[22] Filed: Oct. 8, 1970

[21] Appl. No.: 79,011

[30] Foreign Application Priority Data
Oct. 9, 1969 Germany................. P 19 50 914.9

[52] U.S. Cl................................ 74/745, 192/3.54
[51] Int. Cl....................... F16h 3/08, F16d 67/00
[58] Field of Search............................ 74/740, 745

[56] References Cited
UNITED STATES PATENTS

| | | | |
|---|---|---|---|
| 2,231,966 | 2/1941 | Swennes | 74/740 X |
| 2,487,735 | 11/1949 | Sherman et al. | 74/745 X |
| 2,522,228 | 9/1950 | Hukill | 74/745 X |
| 2,554,313 | 5/1951 | Price | 74/740 X |
| 2,582,895 | 1/1952 | Young | 74/745 |
| 2,654,268 | 10/1953 | Perkins | 74/745 |
| 2,923,175 | 2/1960 | Perkins | 74/740 |
| 3,283,613 | 11/1966 | Perkins | 74/745 |
| 3,382,735 | 5/1968 | Gatiss | 74/745 X |

Primary Examiner—Charles J. Myhre
Assistant Examiner—Thomas C. Perry
Attorney—Walter Becker

[57] ABSTRACT

An arrangement for controlling a multi-stage change gear transmission with a main control group and a control group shiftable under load and either preceding or following the main control group, in which the group shiftable under load has at least two forward stages the step of progression of which is considerably less than, for instance half, the step of progression of the main control group and in which during the shifting operation from one control stage to an adjacent control stage of the main control group first the step of progression of the main control group is subdivided and during the subsequent engagement of the next control stage of the main control group the interposed control stage of the group shiftable under load is automatically made ineffective.

4 Claims, 2 Drawing Figures

METHOD OF AND DEVICE FOR CONTROLLING MULTI-STAGE CHANGE GEAR TRANSMISSIONS

The present invention relates to controlling a multi-stage change gear transmission with a main change gear group and a change gear group which is shiftable under load and/or follows said multi-stage change gear transmission while the control is adapted to be effected by an engageable and disengageable friction clutch and while said group shiftable under load has at least two forward speed stages the progression step of which is considerably less, for instance, one half of a progression step in the main change gear group.

Agricultural tractors with a change gear transmission of the above mentioned type have become known according to which the group which is shiftable under load comprises an additional mechanical reversing group which is adapted selectively to be made effective or ineffective. For purposes of controlling the main group and the group shiftable under load, there is provided a control lever each as actuating member while a further control lever is employed as actuating member for the selective engagement and disengagement of the reversing group. For reasons of cost, the main change gear group which is not shiftable under load has with a change gear transmission of the above referred to type been provided with a smaller number of control stages. This, however, especially when driving on roads and when pulling a trailer, brings about the drawback that in view of the magnitude of the progression steps of the main change gear group, the shifting from one stage to the adjacent stage of the main control group is rather difficult and a kind of jerky driving operation is obtained. Such transmissions can, therefore, be considered merely a partial solution of the problem involved inasmuch as their handling is particularly unsuitable for the operation of vehicles with great pulling power.

It is, therefore, an object of the present invention to provide a transmission control of the above referred to general type which will overcome the above outlined drawbacks and which, particularly when shifting upwardly, will result in small steps between the velocity ranges while simultaneously the operator will be relieved to such an extent that his main attention can be directed to the traffic.

This object and other objects and advantages of the invention will appear more clearly from the following specification in connection with the accompanying drawings, in which:

FIG. 1 shows a control system according to the present invention in which the actuating member of the engageable and disengageable friction clutch is in operative connection with the control lever controlling the group shiftable under load.

Figure 2:
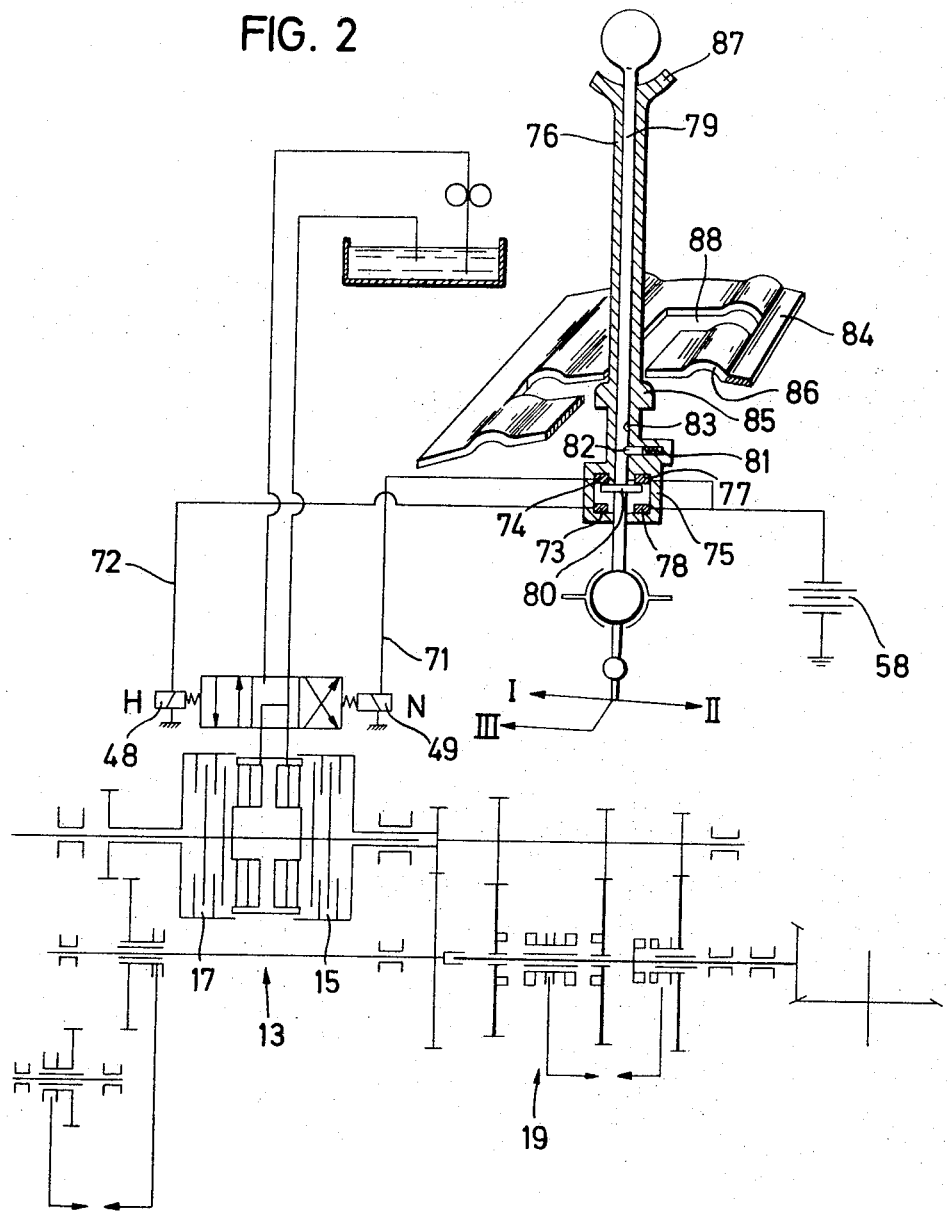

FIG. 2 diagrammatically illustrates a modification of the control system according to the invention in which the control lever of the main change gear group and the control lever of the group shiftable under load are coupled to each other.

The control system according to the present invention is characterized primarily in that during the shifting operation from one control stage to the next control stage of the main change gear group the magnitude of the progression step is first subdivided by a manually engageable control stage of the control group shiftable under load, and that during the next following engagement of the adjacent control stage of the main shiftable group, by means of a control or actuating member thereof or by means of an actuating member of the friction clutch, the intermediately engaged control stage of the group shiftable under load is automatically made ineffective. In this way it will be possible that with a tractor equipped with the transmission of the above mentioned type and with a pulled load, the tractor is accelerated in a jerk-free and continuous manner when the devices for controlling the transmissions are operated properly.

The handling of the actuating members of the transmissions is furthermore considerably improved when during the disengagement of the adjacent control stage of the main shiftable group, the actuating member of the group shiftable under load is automatically returned to the starting position of the control system.

For a change gear transmission in which the actuating member of the main shiftable group is formed as shiftable control lever and in which the control of the control group shiftable under load is effected by fluid pressure actuated clutches and/or brakes having the flow and discharge of the control fluid controlled by a multi-way valve, it is suggested for carrying out the control method according to the invention that the multi-way valve includes an electromagnetically operable valve spool or control slide the magnetic coils of which are in communication with the make-and-break contacts of a switch connected to a source of voltage and that the control lever of the main shiftable group is coupled to the contact emitter or contact carrier of the switch which contact emitter or carrier is displaceable or pivotable by the actuating member of the group shiftable under load. A device which is particularly simple to handle is obtained when the actuating member of the group shiftable under load is designed as a member which is movable, preferably axially movable, on the shiftable control lever. The said member has a handle and is connected to the contact carrier or contact emitter of the switch, said contact emitter or contact carrier being arranged on the shiftable control lever. If with such a device the shiftable control lever is guided in a control coulisse, according to a further development of the invention and for purposes of facilitating the control, it is suggested that the coulisse is so designed that in the end positions of the control lever it is possible, by means of the member movable axially with regard to the control lever, to selectively carry out the shifting of both control stages of the group shiftable under load. It is furthermore suggested that the coulisse between the end positions of the control lever is so designed that during the movement of the control lever from its end position, the member is automatically returned to the position for making the lower control stage of the group shiftable under load effective. Expediently an arresting device is provided between the axially movable member and the control lever.

According to the present invention, with a change gear transmission in which the shifting of the group shiftable under load is effected by fluid-operable clutches and/or brakes, the fluid flow admission and discharge of which is controlled by a multi-way valve operatively connected with a pivotable or displaceable control lever or control rod, the method according to the present invention may be realized by a multi-way valve having an electromagnetically operable valve spool the magnetic spools of which are operatively connected to the make-and-break contacts of a switch connected to a source of voltage, while the contact emitter or contact carrier of the switch is operatively connected with an actuating member of the friction clutch as well as the control lever or control rod of the group shiftable under load. Such simple device of this type may be realized when the control lever of the group shiftable under load is pivotally connected to a transmission member, preferably a rod, which is coupled to the switch and is operatively connected with a lever directly or indirectly frictionally connected to the clutch pedal of the friction clutch.

Referring now to the drawings in detail, the arrangement shown therein comprises an internal combustion engine having a flywheel 1 to which the primary part 2 of an engageable and disengageable friction clutch 3 is centricly connected. The primary part 2 of the friction clutch 3 comprises a pressure plate 5 which is under the load of springs 4 and is non-rotatably but axially displaceably guided in said primary part 2. Interposed between the pressure plate 5 and the flywheel 1 is a friction disc 6 serving as secondary part of the friction clutch. A disc 6 is non-rotatably but axially displaceably arranged on a drive shaft 7. The relaxing of the springs 4 which brings about a disengagement of the friction clutch 3 is effected by means of two-arm levers 8 which are pivotally journalled in the primary part 2. The outer arms of said levers engage the pressure plate 5 whereas their inner arms engage a sectional coupling pressure ring 9. The pressure ring 9 is adapted to be axially displaceable in a counterclockwise direction by means of a non-rotatable lever 11 mounted on a stationarily journalled shaft 10. To this end a clutch pedal 12 is actuated which is likewise non-rotatably connected to shaft 10.

The drive shaft 7 for driving a preceding group 13 of the change gear transmission has its right-hand end journalled in the primary part 14 of a pressure fluid operable disc clutch 15 and has its central portion journalled in the primary part 16 of an adjacent pressure fluid operable disc clutch 17. Through the intervention of the disc clutch 15 and in the direct control stage of the preceding group, the drive shaft 18 of a main control group 19 with mechanically engageable and disengageable control stages is driven by the drive shaft 7. In the stepped-up control stage of the preceding group 13, the main control group 19 is through the disc clutch 17, the primary part 16 thereof and a gear 20 non-rotatably connected thereto driven through counter gears 21, 22 non-rotatably connected to each other and a gear 23 non-rotatably connected to the primary part 14 of the disc clutch 15. The preceding group 13 which is shiftable under load is furthermore provided with a reversing group which comprises a gear 25 axially displaceable on a reversing shaft 24, a gear 21 axially displaceable on a counter shaft and a gear 20. The selective reversing of the reversing group is effected by means of a control lever not illustrated.

The main control group 19 comprises gear pairs 26, 27 and 28, 29 as well as 30, 31, the gears 26, 28 and 30 being non-rotatably connected to the drive shaft 18. On the other hand, the gears 27, 29 are freely rotatably but axially non-movably mounted on an output shaft 32. The gear 31 is rotatable and axially displaceably mounted on the output shaft 32 by which through a bevel gear 33 the bevel gear 34 of an axle drive shaft 35 is driven. Between the two gears 27, 29 a jaw clutch 36 is non-rotatably but axially displaceably mounted on the output shaft 32. By means of the jaw clutch 36 it will be possible selectively to couple the output shaft 32 to the gear 27 or 29. Between the gears 29 and 31 there is provided a clutch member 37 which is non-rotatably and axially non-displaceably mounted on the output shaft 32. By displacing the gear 31 it is possible to couple the clutch member 38 of gear 31 to the clutch member 37. The control of the three possible control stages of the main group 19 is effected by a control lever 39 indicated above the change gear transmission, said control lever being journalled in a universal joint 40. When the control lever 39 is shifted from the illustrated neutral position to the indicated control path I, the output shaft 32 is coupled to the gear 31 by means of non-illustrated control rods or control forks. When pivoting the control lever 39 into the control path II, the gear 29 is coupled to the output shaft 32. The pivoting of the control lever 39 from the illustrated neutral position to the control path III brings about that the gear 27 is coupled to the output shaft 32. The step of progression between the direct control stage of the preceding group 13 and the pertaining stepped up control step is so designed that it corresponds approximately to half the control step between two adjacent control stages of the main control group 19.

The control of the pressure fluid conveyed by a pressure fluid pump 41 from a reservoir 42 through a conduit 43 to and from the disc clutches 15, 17 is effected by a multi-way valve 44 which through a conduit 45; 46 communicates with the non-illustrated working cylinders of the disc clutches. Furthermore, the multi-way valve 44 is through a return conduit 47 in communication with the reservoir 42. The multi-way valve 44 has a valve spool symbolically illustrated which is controlled by magnetic coils 48, 49 as to its three possible control positions. The magnetic coils 48 and 49 are through electric conduits 50 and 51 respectively in electric connection with the contacts 52 and 53 of a switch 54. Located opposite the contacts 52 and 53 and arranged on the contact carrier of the switch 54, there are provided contacts 55, 56 which through a common conduit 57 are electrically connected to a voltage source 58. Switch 54 furthermore has a contact bridge 59 which is axially displaceable on a rod 60 and is held between two springs 61 and 62. The springs 61 and 62 rest on collars 63, 64 which are firmly arranged on rod 60. That end of rod 60 which is adjacent the switch is guided in a bushing 65 whereas the other end of rod 60 is guided in a bushing 66. The last mentioned end of rod 60 is located within the range of action of a lever 67 which is non-rotatably connected to shaft 10. Rod 60 is furthermore coupled through a follower 68 to a control lever 69 for serving the preceding group 13, said lever 69 being journalled on a pivot 70 stationarily arranged on the tractor.

OPERATION OF THE DEVICE ACCORDING TO FIG. 1.

If it is desired to accelerate a tractor with the described device illustrated in its neutral position from a standstill in forward driving direction, the friction clutch 3 is first by means of the clutch pedal 12 disengaged and subsequently the control lever 39 is shifted into the control position I. Since the control lever 69 occupies its control position N, it will be appreciated that after engaging the friction clutch 3, the tractor will be driven in a direct control stage of the preceding group 13 and in the lowermost control stage of the main control group 19. If it is subsequently desired to further accelerate the tractor from control stage I of the main control group 19, first the control lever 69 is manually shifted in clockwise direction into the position H. In this way the left end of rod 60 engages the lever 67 and simultaneously, by means of the contact bridge 59, the contact 55 is connected to the contact 52, and the contacts 53 and 56 are disengaged. As a result thereof, the magnetic coil 49 is disengaged from the voltage source 58, and the magnetic coil 48 is connected to the voltage source 58. Consequently, the disc clutch 15 is through the return flow line 47 connected to the pressure-less reservoir 42, and the disc clutch 17 is engaged while the stepped up control stage of the preceding group 13 is engaged. As a result thereof and in conformity with the present invention, the step of progression between control step I and control step II is subdivided. If it is now desired further to accelerate the tractor by shifting over to control stage II, first the friction clutch 3 is disengaged by the clutch pedal 12. As a result thereof, it is brought about that by means of lever 67 the rod 60 is returned to its FIG. 1 position whereby the contact bridge 59 separates from the contacts 52 and 55, and the contacts 53 and 56 are connected to each other. As a result thereof and in conformity with the present invention, an automatic switch-over to the direct control stage is effected in the preceding group. If subsequently the control lever 39 is pivoted to control position II, it will be appreciated that after engaging the friction clutch 3, the tractor will be driven in the lowermost control stage of the preceding group 13 and in the second control stage of the main control group. If it is desired further to accelerate the tractor from control stage II to control stage III of the main control group, it is possible first to subdivide the step of progression between the control stage II and the control stage III of the main control group 19 by the preceding group 13. This is done by actuating the control lever 69, and subsequently a further shift-over to control stage III may be effected.

For the electrohydraulic device diagrammatically illustrated in FIG. 2, there is assumed a change gear transmission with a friction clutch according to FIG. 1. The control of the pressure fluid operable disc clutches 15, 17 is likewise effected by a multi-way valve 44 which is likewise controlled by magnetic coils 48 and 49. The magnetic coils 48 and 49 are through a line 71; 72 electrically connected to the contacts 73, 74 of a switch 75. Switch 75 is arranged on a control sleeve 76 and has its contacts 77, 78 which are located opposite contacts 73 and 74 connected to the voltage source 58. The control sleeve 76 is axially guided on a control lever 79 which serves for controlling the main group 19. Between the contact pairs 73 and 78, 74 and 77 and on the control lever 79 there is provided a contact bridge 80 through which in response to a displacement of the control sleeve 76, selectively the contacts 73 and 78, 74 and 77 are connected to each other. The control sleeve 76 is furthermore above the switch 75 provided with an arresting device in the form of a spring-loaded pin 81 which in both possible control positions of the control sleeve 76 engages a recess 82 and 83 respectively of the control lever 79. Above the arresting device 81, the control sleeve 76 is provided with a bell-shaped collar 85, said sleeve 76 together with the control lever 79 being guided in a control coulisse 84.

When the control lever 79 occupies the illustrated neutral position, the collar 85 engages the lower edge of the coulisse 84. In the end position for the control positions I-III, the coulisse 84 is provided with bulges 86. The contour thereof corresponds to the collar 84. The depth thereof is so dimensioned that in the end positions of the control lever 79 the control sleeve 76 may be moved upwardly by means of a handle member 87. The foregoing makes it possible to disengage the contacts 74 and 77 from each other by the control bridge 80 and to connect the contact 73 and 78 to each other. The merging area of the bulges 86 with the central portions 88 of the coulisse 84 is such that in response to a pivoting of the control lever 79 from an engaged end position the collar 85 brings about an automatic displacement of the control sleeve 76 for a shift-over of switch 75.

The operation of the device according to FIG. 2 is with regard to the group 13, the main group 19 and the multi-way valve 44 the same as that described in connection with FIG. 1. Similarly, the shifting of the main control group 19 is effected by the control lever 79 in the manner described in connection with the device of FIG. 1. However, the control of group 13 is according to the arrangement of FIG. 2 effected by the control sleeve 76 in combination with switch 75. This is effected, for instance, after acceleration of the tractor in control stage I with the control lever pivoted in clockwise direction into the left-hand control path. More specifically, this is effected by pulling the control sleeve 76 over the member 87 in upward direction whereby the multi-way valve 44 is reversed and the group 13 is changed from the stepped up control stage to the direct control stage. As a result thereof, according to the present invention, the step of progression to the adjacent control stage II of the main control group 19 is subdivided. A subsequent shifting of control lever 79 from control position I to control position II in order to effect a further acceleration, brings about that in response to the movement of the control lever 79, the bell-shaped collar 85 is displaced downwardly whereby the interposed stepped up control stage of group 13 shiftable under load is automatically made effective.

It is, of course, to be understood that the present invention is, by no means, limited to the particular showing in the drawings but also comprises any modifications within the scope of the appended claims.

What I claim is:

1. In a transmission having an input shaft and an output shaft and a plurality of gear sets interposed between said shafts for providing various speed ranges for the transmission, a main control element movable for making said gear sets selectively effective, a pair of power flow paths in parallel with each other and in series with said gear sets and having respectively different drive ratios which bear a ratio to each other less than the ratio between successive speed ranges of said transmission provided by said gear sets, control means for making said flow paths selectively effective, first means for actuating said control means to make the higher drive ratio power path effective, second means for actuating said control means to make the lower drive ratio power path effective, said first means being operable prior to making a respective gear set ineffective and said second means being operable after the said gear set has been made ineffective and prior to the next gear set being made effective, each said flow path having a friction clutch therein actuatable to make the respective flow path effective, said control means comprising fluid actuations for said friction clutches and a control valve controlling said fluid actuations, said first and second means comprising solenoid actuators for said control valve and switches interposed between said solenoid actuators and a source of electrical energy, said main control element being in the form of a control lever having a plurality of shifted positions in each of which a respective gear set is effective while the other gear sets are ineffective, switch actuating means operable in response to movement of said control lever away from a shifted position thereof for actuating the switch pertaining to said first means thereby to make the higher drive ratio flow path effective, and said switch actuation means being operable manually after said control lever is moved into a shifted position to make the switch pertaining to said second means effective.

2. A transmission according to claim 1, in which said switch operating means is in the form of a member which is axially reciprocable on said control lever, a guide guiding said control lever during shifting thereof, and cam regions on said guide operable to move said switch actuating member in one direction on said control lever as said control lever moves away from any shifted position thereof.

3. A transmission according to claim 2, which includes detent means between said control lever and said switch actuating member to releasably detain the latter in axially shifted positions on said control lever.

4. A transmission according to claim 2, in which said guide is in the form of a slotted plate with said control lever extending through the slot in the plate, said switch actuating member also extending through the slot, recesses formed in the plate at the shifted positions of said control lever, and means on said member engaging the plate and receivable in a respective recess in the pertaining shifted position of said control lever.

* * * * *